Feb. 7, 1950  R. EICHENBERG  2,496,451
REFINERY VALVE

Filed March 29, 1948  2 Sheets-Sheet 2

Robert Eichenberg
INVENTOR.
BY J. Vincent Martin
Ralph R. Browning
James B. Simms
ATTORNEYS Patented Feb. 7, 1950

2,496,451

UNITED STATES PATENT OFFICE 2,496,451

REFINERY VALVE

Robert Eichenberg, Houston, Tex., assignor to McEvoy Company, Houston, Tex., a corporation of Texas Application March 29, 1948, Serial No. 17,717

9 Claims. (Cl. 251—63.5)

1

This invention relates to improvements in valves and refers more particularly to valves especially adapted for use in controlling the flow of organic fluids at coking temperatures.

In certain operations it is frequently necessary to control the flow of organic fluids under temperature conditions under which the fluid being handled is partially coked. Valves heretofore used under these conditions have not proven satisfactory because of the tendency of the valves to coke up to the extent that they cannot be closed. Because of this, it has been the usual practice, for instance in conduits associated with apparatus for cracking petroleum to use a plurality of valves, usually three, in each conduit. Usually one of the valves can then be operated but it is not infrequently the case that all of the valves will be coked up and the whole unit will have to be shut down.

An object of this invention is to provide a valve especially adapted to control high temperature organic fluids.

Another object is to provide a valve which does not readily coke up when used for controlling organic fluids at coking temperatures.

A further object is to provide a gate valve having an enlarged body recess or chamber for receiving the gate when the valve is to be shut with means substantially dividing off the chamber and restricting circulation of line fluid through the recess with the valve open thereby reducing the likelihood of formation and accumulation of sufficient coke in the recess to prevent proper operation of the valve.

Still another object is to provide a gate valve having an enlarged recess or chamber in the body for receiving the gate when the valve is to be closed and having means for dissipating the heat from the portion of the valve body wall forming the recess, whereby the temperature of the fluid within the recess may be maintained below the usual critical coking temperature for the fluid.

Yet a further object is to provide in a gate valve a chamber for receiving the gate when in closed position wherein the gate carries a part which serves as a false partition for substantially closing off the chamber, from the line fluid, when the gate is in open position and wherein the partition does not materially interfere with free operation of the gate.

Other and further objects of this invention will appear from the following description.

In the accompanying drawings which form a part of the instant specification and are to be

2 read in conjunction therewith and wherein like reference numerals are employed to indicate like parts in the various views:

Figure 1:
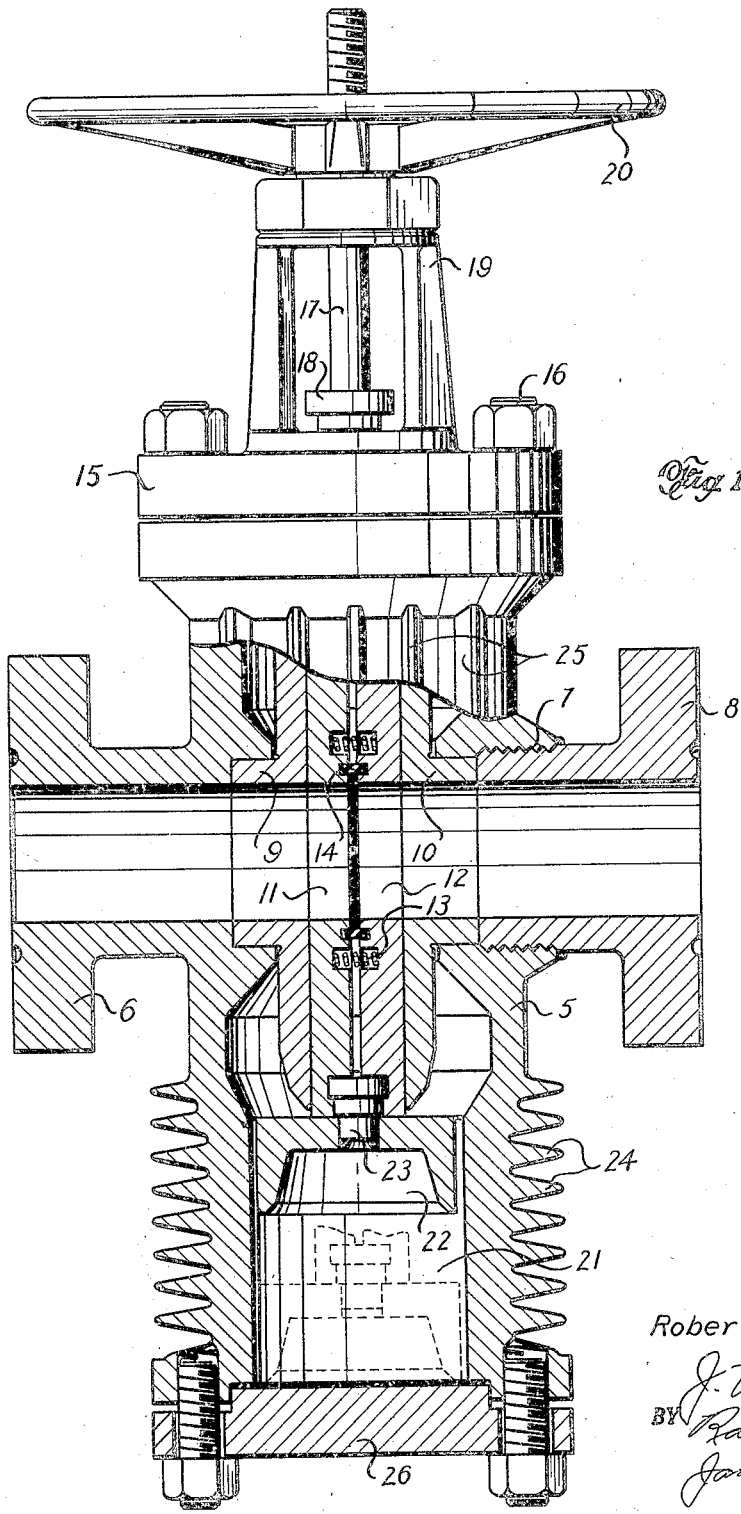
Fig. 1 is a vertical sectional view of a valve constituting an embodiment of this invention.

Referring to the embodiment of the invention shown in Fig. 1 the numeral 5 designates a valve body having a flanged fitting 6 adapted to be connected to a flow line and a threaded opening 7 which receives a flanged fitting 8 also adapted to be connected to a flow line. The fittings 6 and 8 have aligned passageways for conducting fluid through the valve.

The valve seat assembly includes two full length seats 9 and 10 having cylindrical extensions that fit respectively in a counter bore in fitting 6 and in opening 7. The valve gate assembly is made up of two parts 11 and 12 which are urged apart and in abutment with the adjacent seat elements by coil springs 13. A seal is provided between the two gate members by seal ring 14 disposed in opposed registering grooves formed on the inner surfaces of the gate.

The gate is adapted to move vertically within the valve body and any suitable actuating mechanism may be provided in accordance with conventional practice for actuating the valve. In the embodiment illustrated the valve bonnet 15 is secured to the body by suitable bolts 16 and the gate is carried at the lower end of the valve stem 17 which extends through a stuffing box 18. Risers 19 rotatably carry hand-wheel 20 which has a threaded connection with the upper end of stem 17. The stem is held against rotation by the gate and seat members and thus rotation of the hand wheel in one direction raises the gate and rotation of the hand wheel in the opposite direction lowers the gate.

In order to prevent the likelihood of the valve coking up when handling organic fluids at coking temperatures, an enlarged chamber 21 is provided within the valve body to receive the gate when it is shifted from the open position shown in Fig. 1 to a lowered position with the upper portion of the gate closing off the passageway through the seat members. The portion of the body wall forming chamber 21 preferably is cylindrical in shape but may deviate from this and assume any suitable shape. The size of the chamber relative to the gate is such that any coke that might form within the chamber will settle to the bottom of the chamber and not interfere with the proper closing of the valve. However, it has been found to be necessary to substantially close off communication of chamber 21 with the main passageway through the valve.

Chamber 21 must be substantially closed off because if line fluid is permitted to circulate continuously through the chamber the temperature of the fluid within the chamber will be maintained substantially above the critical coking temperature and coke will continuously form and eventually accumulate to an extent to prevent proper functioning of the valve. The arrangement of seat and gate shown substantially cuts down any tendency for the line fluid to circulate through the chamber 21 but it has been found preferable to additionally separate the chamber from the remainder of the interior of the body.

This may be suitably accomplished by providing a false partition 22 which moves in the chamber in response to movement of the gate. This false partition member 22 may be in the form of a piston and preferably is secured to the valve element. Member 22 may be connected to the valve element by welding thereto a pin 23 having an enlarged head which fits corresponding grooves formed in the gate members. With this arrangement the member 22 will rise and fall in response to movement of the gate.

Partition 22 may be fabricated from metal, but where the fluids to be handled are at a temperature greatly above their critical temperature, it is preferable to fabricate the partition at least in part from a material having poor heat transfer characteristics, as for example asbestos, fire clay and the like. This will then serve as a heat barrier for aid in maintaining the temperature within chamber 21, beneath the partition, below the critical temperature of the fluid.

Member 22 preferably has a loose or sloppy fit within chamber 21 whereby fluid is free to flow past the piston upon actuation of the valve. The arrangement is such that the entrance to chamber 21 is substantially separated or blocked off when the piston is in raised position.

While the loose fit of the piston is required in order to prevent sticking of the member 22 within the chamber 21 and to reduce the dash-pot effect, nevertheless clearance of .025" has been found suitable and this maintains the liquid beneath the member substantially dormant. In the drawings this loose fit is exaggerated for purposes of illustration.

The body wall surrounding chamber 21 is preferably equipped with means for dissipating heat from the wall whereby the fluid within chamber 21 may be maintained below the critical coking temperature. For ordinary refinery operation for handling fluid in connection with cracking operations where the fluid temperature is usually in the neighborhood of 1100° F., it has been found that fins 24 surrounding chamber 21 will maintain the temperature of the fluid within chamber 21 below the critical coking temperature when the coking temperature of the fluid is 700° F. In this connection, it is also advisable to provide the valve body with fins 25 for further dissipating heat from the valve body.

In operation the valve is connected in a conduit and with the valve element in the position shown in Fig. 1 the passage through the valve element is aligned with flow passage through the fittings 6 and 8 and the seat members 9 and 10. In this open position the false partition 22 is positioned in the entrance to the chamber 21 and substantially separates the chamber from the remainder of the interior of the valve body. Thus this recess within the body is separated from the line fluid and for practical purposes the line fluid does not circulate in the chamber.

It is important that the false partition have a loose fit throughout the length of the chamber whereby it is free to move axially of the chamber and the flow of fluid past the partition member during this movement is relatively free to reduce the dash-pot effect that resists movement of the gate. However, the only place that it is necessary to provide a relative close fit as for instance a clearance of .025" is between the partition member and the wall of the chamber when the member is in its raised position. The fit of the partition with the body wall, when in a lower position, may be much looser.

When the valve is in open position the close fit between the seat members and the valve body and the seat members and the valve gate is such as to provide a relatively quiet zone of fluid within the main portion of the valve body just surrounding the valve passageway. The tendency for this fluid to circulate through the chamber 21 is almost completely nullified by the position of the false partition at the entrance of the chamber. Thus a body of fluid is trapped within the chamber in a position where there is very little addition of heat to the fluid. There is a constant dissipation of the head due to the heat transferring fins or vanes 24 surrounding the chamber, and the fins 25 constantly cool the main portion of the valve body reducing the tendency for heat to flow from the main portion of the valve body to the portion surrounding chamber 21. When the gate is actuated to shut the valve the false partition moves downwardly within chamber 21 and the fluid beneath the partition is free to flow past the partition to the upper portion of the chamber due to the loose fit of the partition.

With this construction there is very little tendency for coke to form within the valve and particularly within chamber 21. However the body may be formed with a removable cap 26 at the lower end of the chamber which facilitates assembly of the valve and the cleaning out of any coke that might accumulate over long periods of use. It is contemplated that this cap may carry a drain plug.

Figure 2:
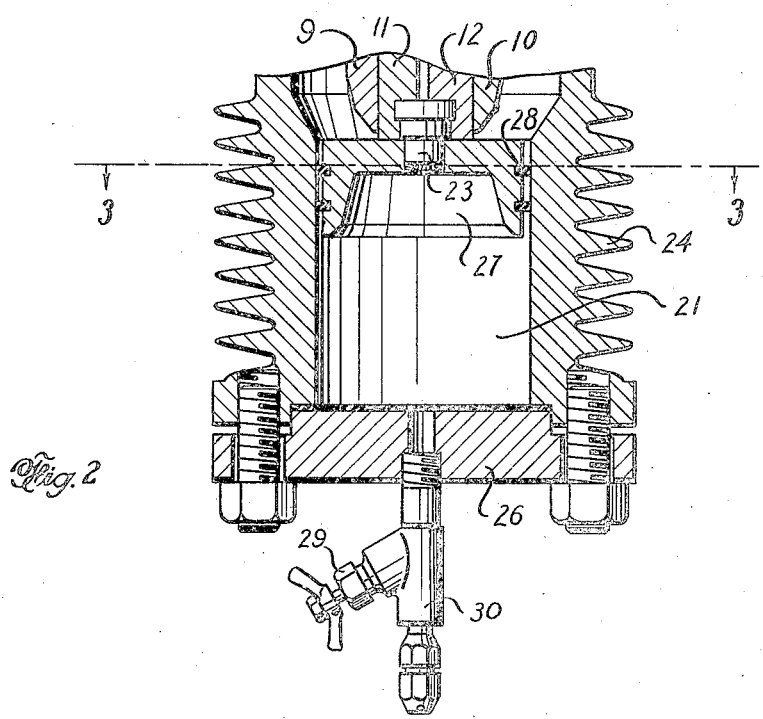
Fig. 2 is a fragmentary sectional view of a modified valve embodying this invention.
Figure 3:
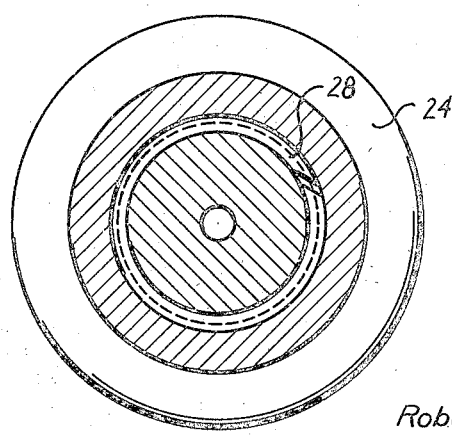
Fig. 3 is a view taken along the line 3—3 in Fig. 2 in the direction of the arrows.

In the modification shown in Fig. 2 the false partition 27 is provided with automotive type split rings 28. These rings provide a better seal between the partition and the valve body or chamber wall and yet ordinarily do not unduly retard actuation of the valve as the fluid may by-pass the partition when the partition is shifted within the chamber by flowing through the space formed by the split in the rings. However with this arrangement of parts it is desirable to provide a relief valve 29 which will permit escape of fluid from the chamber beneath the partition in the event that the opening at the split of the automotive type rings becomes coked up.

This modification also carries an alemite type fitting 30 by which a suitable non-coking lubricant may be supplied to the under side of the false partition. When such a lubricant is to be employed, all coking within the chamber may be positively and completely avoided. However, the other modification shown in Fig. 1 is preferred because of its simplicity of structure, satisfactory results, and because there never is the necessity with this structure of permitting the escape of flammable fluids at elevated temperatures from the chamber 21 when the valve is actuated. Obviously the escape of such fluid usually presents an objectionable fire hazard.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and sub-combinations. This is contemplated by and is within the scope of the claims.

As many possible embodiments may be made of the invention without departing from the scope thereof, it is to be understood that all matter herein set forth as shown in the accompanying drawings is to be interpreted as illustrative and not in a limiting sense.

Having described the invention, what is claimed is:

1. In a gate valve a body with a passage therethrough, a valve gate mounted for reciprocal movement within the body to control the passage, an internal recess in the body within which the valve gate is adapted to move when actuated, and means separate from and loosely carried by the valve gate substantially obstructing circulation of line fluid within the recess in operation with the valve gate in open position.

2. In a gate valve a body with a passage therethrough, a valve gate mounted for reciprocal movement within the body to control the passage, an internal recess in the body within which the valve gate is adapted to move when actuated, means for dissipating heat from the portion of the valve body forming the recess, and means separate from and loosely carried by the valve gate substantially obstructing circulation of line fluid within the recess in operation with the valve gate in open position.

3. A valve usable for controlling conduits handling organic fluids at coking temperatures comprising a body with a passageway therethrough, a gate type valve element operably mounted for reciprocation within the body to control the passageway, a chamber formed within the body and adapted to receive the valve element to accommodate reciprocal movement thereof and a false partition carried by the valve element and loosely fitting the chamber and adapted to be reciprocated within the chamber upon reciprocation of the valve element and when in a position at the entrance of the chamber with the valve open substantially blocking the circulation of line fluid within the chamber.

4. A valve usable for controlling conduits handling organic fluids at coking temperatures comprising a body with a passageway therethrough, a gate type valve element operably mounted for reciprocation within the body to control the passageway, a chamber formed within the body and adapted to receive the valve element to accommodate reciprocal movement thereof and a false partition carried by the valve element loosely fitting the chamber and adapted to be reciprocated within the chamber upon reciprocation of the valve element, said false partition when in a position at the entrance of the chamber with the valve open substantially blocking circulation of line fluid within the chamber, and fins formed exteriorly upon the portion of the body forming the chamber for dissipating heat from within the chamber.

5. A valve usable for controlling conduits handling organic fluids at coking temperatures comprising a body with a passageway therethrough, a gate type valve element operably mounted for reciprocation within the body to control the passageway, a chamber formed within the body and adapted to receive the valve element to accommodate reciprocal movement thereof and a false partion carried by the valve element and loosely fitting the chamber adapted to be reciprocated within the chamber upon reciprocation of the valve element, said partition when positioned at the entrance to the chamber with the valve open substantially blocking circulation of line fluid within the chamber, and fins formed exteriorly of the body for dissipating heat from the body.

6. In a valve usable for controlling flow of organic fluids at coking temperatures, a body with a flow passage therethrough and a gate type valve element mounted for reciprocal movement within the body for controlling the passage, a chamber formed within the body for accommodating reciprocation of the valve element and a false partition mounted for movement within the chamber, means for by-passing fluid past the partition upon movement thereof, means providing for movement of the partition in response to movement of the valve element, said false partition in its position at the entrance of the chamber with the valve open substantially blocking circulation of line fluid within the chamber.

7. In a valve usable for controlling flow of organic fluids at coking temperatures, a body with a flow passage therethrough and a gate type valve element mounted for reciprocal movement within the body for controlling the passage, a chamber formed within the body for accommodating reciprocation of the valve element and a false partition mounted for movement within the chamber, means for by-passing fluid past the partition upon movement thereof, means providing for movement of the partition in response to movement of the valve element, said false partition in its position at the entrance of the chamber with the valve open substantially blocking circulation of line fluid within the chamber, and means for dissipating heat from the portion of the body forming the chamber.

8. In a valve usable for controlling flow of organic fluids at coking temperatures, a body with a flow passage therethrough and a gate type valve element mounted for reciprocal movement within the body for controlling the passage, a substantially cylindrical chamber formed within the body for accommodating reciprocation of the valve element, a piston-like false partition mounted for movement within the chamber, means for by-passing fluid past the partition upon movement thereof, means providing for movement of the partition in response to the movement of the valve element, automotive type split seal rings carried by the partition providing a substantial seal between the chamber wall and the partition the split in the ring providing a passage for by-passing fluid upon movement of the partition.

9. In a valve usable for controlling flow of organic fluids at coking temperatures, a body with a flow passage therethrough and a gate type valve element mounted for reciprocal movement within the body for controlling the passage, a substantially cylindrical chamber formed within the body for accommodating reciprocation of the valve element, a piston-like false partition mounted for movement, means providing for movement of the partition within the chamber in response to the movement of the valve element, automotive type split rings carried by the partition providing a substantial seal between the chamber wall and the partition with the valve open, the split in the ring providing a passage for by-passing fluid upon movement of the partition, and means exteriorly of the valve for introducing to and discharging fluid from the chamber.

ROBERT EICHENBERG.

REFERENCES CITED

The following references are of record in the file of this patent:

UNITED STATES PATENTS

| Number | Name | Date |
|---|---|---|
| 120,664 | Peet | Nov. 7, 1871 |
| 1,679,218 | Huff | July 31, 1928 |
| 1,869,741 | DuBois | Aug. 2, 1932 |
| 2,230,600 | Olson | Feb. 4, 1941 |